United States Patent [19]

Susa et al.

[11] Patent Number: 5,760,122

[45] Date of Patent: Jun. 2, 1998

[54] MATTE PAINT FILM, AND MATTE PAINT COMPOSITION

[75] Inventors: Daisuke Susa; Takashi Yamaguchi, both of Wako; Masami Imada, Toride, all of Japan

[73] Assignee: Honda Giken Kogyo Kabushiki Kaisha, Chiba, Japan

[21] Appl. No.: 502,586

[22] Filed: Jul. 14, 1995

[30] Foreign Application Priority Data

Jul. 15, 1994 [JP] Japan .................. 6-164412

[51] Int. Cl.$^6$ .............. C08J 5/10; C08K 3/34; C08L 75/04
[52] U.S. Cl. .............. 524/493; 524/492; 524/494
[58] Field of Search .................. 524/492, 493, 524/494

[56] References Cited

U.S. PATENT DOCUMENTS

| | | | |
|---|---|---|---|
| 3,714,085 | 1/1973 | Berstein et al. | 260/39 |
| 4,684,675 | 8/1987 | Collier | 523/220 |
| 4,719,141 | 1/1988 | Collier | 428/144 |
| 5,034,207 | 7/1991 | Kerner et al. | 423/339 |

FOREIGN PATENT DOCUMENTS

| | | |
|---|---|---|
| 04353576 | 12/1992 | European Pat. Off. . |
| 4-353576 | 12/1992 | Japan . |
| 5-117548 | 5/1993 | Japan . |
| 444559 | 1/1974 | WIPO . |

Primary Examiner—Vasu Jagannathan
Assistant Examiner—U. K. Rajguru
Attorney, Agent, or Firm—Armstrong, Westerman, Hattori, McLeland & Naughton

[57] ABSTRACT

A matte paint film includes a synthetic resin component as a paint film forming primary element, and silica particles having an average particles size $D_1$ in a range of $D_1 \leq 2$ μm and synthetic resin particles having an average particle size $D_2$ in a range of $8 m \leq D_2 \leq 50$ μm as a matting agent. The weight proportion Pw of matting agent incorporated per 100 parts by weight of the synthetic resin component is set in a range of 20 parts by weight $\leq Pw \leq 100$ parts by weight. The weight ratio Wr ($W_1/W_2$) of the weight $W_1$ of silica particles incorporated in the matting agent to the weight $W_2$ of synthetic resin particles incorporated in the matting agent is set in a range of $20/80 \leq Wr \leq 70/30$, and the thickness t of the paint film is set in a range of $8$ μm $\leq t \leq 30$ μm. A 60° incident ray $L_1$ is absorbed and/or irregularly reflected mainly by the silica particles in the film surface. On the other hand, a 85° incident ray $L_2$ is irregularly reflected and/or absorbed mainly by the synthetic resin particles partially protruding on the film surface and the silica particles deposited on the surfaces of such synthetic resin particles.

6 Claims, 11 Drawing Sheets

MATTE PAINT FILM, AND MATTE PAINT COMPOSITION

BACKGROUND OF THE INVENTION

1. Field of the Invention

The present invention relates to a matte paint film, e.g., an improvement in a matte paint film existing on a surface of each of various synthetic resin products, and a matte paint composition for use in the formation of such a paint film.

2. Description of the Prior Art

There are conventionally known matte paint films of this type, which include a synthetic resin component as a paint film forming primary material, and silica particles and synthetic resin particles as a matting agent (for example, see Japanese Patent Application Laid-open Nos. 353576/92 and 117548/93).

However, the known matte paint film has a problem that the surface thereof includes portions which appear to be sufficiently matted, or conversely to be bright, depending upon the viewing direction. This is significant as viewed along the film surface.

When a matte paint film is formed on a synthetic resin material and then, the synthetic resin material is subjected to molding to produce a synthetic resin product, the generation of the above phenomenon is significant between a portion stretched to a small extent, or not stretched and a portion stretched to a large extent, and causes a reduction in the value of the synthetic resin product.

The present inventors have made various studies about the known matte paint film and as a result, have reached the following conclusion: the reason why the above-described phenomenon is generated is that the known matte paint film was produced while taking account of only the glossiness related to an incident ray having an inclination angle of 60° with respect to the perpendicular to the film surface of the matte paint film. To avoid the generation of such a phenomenon, the glossiness related to an incident ray having an inclination angle of 85° with respect to the perpendicular, namely, a 85° incident ray, must be also taken into consideration, and both the glossinesses related to the 60° and 85° incident rays must be very greatly decreased.

SUMMARY OF THE INVENTION

It is an object of the present invention to provide a matte paint film of the above-described type, wherein the related to the 60° and 85° incident rays are very greatly decreased by establishing a particular interrelation among the amount of matting agent incorporated based on the synthetic resin component, the average particle size of the matting agent, the ratio of the silica particles incorporated in the matting agent to the synthetic resin particles incorporated in the matting agent and the thickness of the paint film, thereby providing a high matting effect.

To achieve the above object, according to the present invention, there is provided a matte paint film comprising a synthetic resin component as a paint film forming primary element, and silica particles having an average particle size $D_1 \leq 2$ μm and synthetic resin particles have an average particle size $D_2$ in a range of 8 μm $\leq D_2 \leq$ 50 μm as a matting agent, the weight proportion Pw of matting agent incorporated per 100 parts by weight of the synthetic resin component being set in a range of 20 parts by weight $\leq$ Pw $\leq$ 100 parts by weight, the weight ratio Wr=$W_1/W_2$ of the weight $W_1$ of silica particles incorporated in the matting agent to the weight $W_2$ of synthetic resin particles incorporated in the matting agent being set in a range of 20/80 $\leq$ Wr $\leq$ 70/30, and the thickness t of the paint film being set in a range of 8 μm $\leq$ t $\leq$ 30 μm.

In this matte paint film, the silica particles are deposited on surfaces of the synthetic resin particles, and are individually dispersed into the film surface and the synthetic resin component, and some of the synthetic resin particles partially protrude from the film surface.

With such a configuration, the 60° incident ray is absorbed and/or irregularly reflected mainly by the silica particles on the film surface. On the other hand, the 85° incident ray is irregularly reflected and/or absorbed mainly by the synthetic resin particles partially protruding from the film surface and the silica particles deposited on the surfaces of such synthetic resin particles.

Thus, it is possible to decrease both the glossiness related to the 60° and 85° incident rays, and to very greatly decrease the difference between the glossinesses, thereby largely enhancing the matting effect.

This applies when a matte paint film is formed on a synthetic resin material, and the resulting material is then subjected to molding to produce a synthetic resin product.

However, if the average particle size $D_1$ of the silica particles is larger than 2 μm, the absorption and irregular reflection of the 60° incident ray are insufficient. The lower limit value of the average particle size of the silica particles is equal to 0.01 μm. If $D_1 <$ 0.01 μm, the absorption and irregular reflection of the 60° incident ray are likewise insufficient and moreover, it is difficult to produce silica particles having such an average particle size $D_1$.

If the average particle size $D_2$ of the synthetic resin particles is smaller than 8 μm, the protrusion of synthetic resin particles form the paint surface is small in amount, because of the relationship to the thickness t of the paint film and for this reason, the irregular reflection and absorption of the 85° incident ray is insufficient. On the other hand, if $D_2 >$ 50 μm, the protrusion of the synthetic resin particles from the paint surface is increased in amount, because of the relationship to the thickness t of the paint film and for this reason, such particles are liable to fall off the paint film. From this respect, it is desirable that the relationship between the average particle size $D_2$, and the thickness t of the paint film is $D_2/2 <$ t.

Further, if the weight proportion Pw of matting agent incorporated is smaller than 20 parts by weight, there is no addition effect. On the other hand, if Pw > 100 parts by weight, whitening and cracking of the matte paint film are produced.

If the weight ratio Wr of the silica particles to the synthetic resin particles is smaller than 20/80, the absorption and/or the irregular reflection of the 60° incident ray are or is insufficient, because of the small amount of silica particles incorporated. On the other hand, if Wr > 70/30, the absorption and/or the irregular reflection of the 85° incident ray are or is insufficient, because of a small amount of synthetic resin particles incorporated. The weight ratio is preferably in a range of 25/75 $\leq$ Wr $\leq$ 45/55.

Further, if the thickness t of the paint film is less than 8 μm, the synthetic resin particles are liable to fall off of the paint film, because of the relationship between the thickness t and the average particle size $D_2$ of the synthetic resin particles. On the other hand, if t > 30 μm, whitening and cracking of the matte paint film are produced in the molding process, and the synthetic resin particles are liable to be buried in the paint film, resulting in insufficient irregular reflection and/or absorption of the 85° incident ray.

It is another object of the present invention to provide a matte paint composition, from which a matte paint film of the above-described type can be easily formed.

To achieve the above object, according to the present invention, there is provided a matte paint composition comprising a synthetic resin component as a paint film forming primary material, and silica particles having an average particle size $D_1 \leq 2$ μm and synthetic resin particles having an average particle size $D_2$ in a range of 8 μm$\leq D_2 \leq$50 μm as a matting agent, the weight proportion Pw of matting agent incorporated per 100 parts by weight of the synthetic resin component being set in a range of 20 parts by weight$\leq$Pw$\leq$100 parts by weight, and the weight ratio Wr (=$W_1/W_2$) of the weight $W_1$ of silica particles incorporated in the matting agent to the weight $W_2$ of synthetic resin particles incorporated in the matting agent being set in a range of 20/80$\leq$Wr$\leq$70/30.

The above and other objects, features and advantages of the invention will become apparent from the following description of the preferred embodiments taken in conjunction with the accompanying drawings.

DESCRIPTION OF THE PREFERRED EMBODIMENTS

Figure 1:
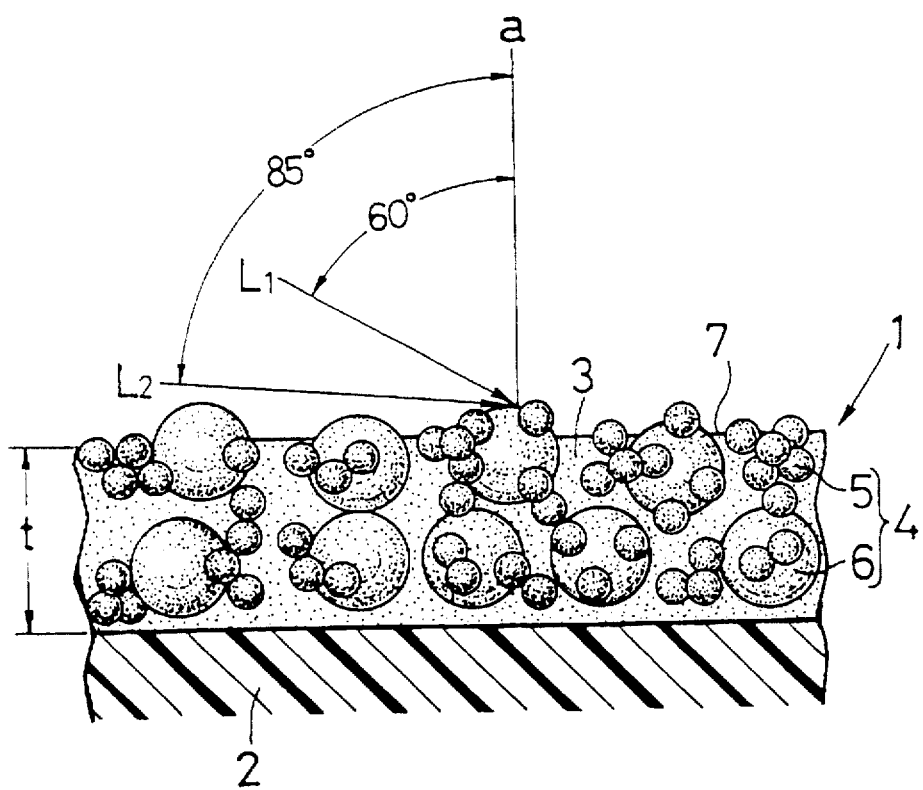
FIG. 1 is a diagrammatic sectional view of a matte paint film.

Referring to FIG. 1, a transparent matte paint film 1 is formed on a surface of a PVC (polyvinyl chloride) sheet 2. The matte paint film 1 contains a synthetic resin component 3 as a paint film forming primary material, and also contains, as a matting agent 4, silica particles 5 having an average particle size $D_1$ in a range of $D_1 \leq 2$ μm and synthetic resin particles 6 having an average particle size $D_2$ in a range of 8 μm$\leq D_2 \leq$50 μm.

The weight proportion Pw of matting agent 4 incorporated per 100 parts by weight of the synthetic resin component 3 is set in a range of 20 parts by weight$\leq$Pw$\leq$100 parts by weight. When the weight of silica particles 5 incorporated in the matting agent 4 is represented by $W_1$ and the weight of synthetic resin particles 6 incorporated in the matting agent 4 is represented by $W_2$, the weight ratio Wr=$W_1/W_2$ of the silica particles 5 to the synthetic resin particles 6 is set in a range of 20/80$\leq$Wr$\leq$70/30. Further, the thickness t of the paint film is set in a range of 8 μm$\leq$t$\leq$30 μm.

In the matte film 1 of such a configuration, a portion of the synthetic resin particles 6 partially protrudes on the surface 7 of the matte paint film 1, and the silica particles 5 are deposited individually or agglomeratedly onto the surfaces of the synthetic resin particles 6, or dispersed individually into the film surface 7 and the synthetic resin component 3.

The measurement of the glossiness Gs (gloss) of the matte paint film 1 is carried out according to JIS Z 8741. The 60° incident ray $L_1$ is defined as an incident ray having an inclination angle of 60° with respect to the perpendicular a to the film surface 7, and the 85° incident ray $L_2$ is defined as an incident ray having an inclination angle of 85° with respect to the perpendicular a.

In the matte paint film 1, the glossiness Gs (60) related to the 60° incident ray $L_1$ is generally in a range of 0%$\leq$Gs (60)$\leq$10%, and the glossiness GS (85) related to the 85° incident ray $L_2$ is also in a similar range.

In the matte paint film 1 of the above-described configuration, the 60° incident ray $L_1$ is absorbed and/or irregularly reflected mainly by the silica particles 5 in the film surface 7 to provide a glossiness Gs(60)$\leq$10%. On the other hand, the 85° incident ray $L_2$ is irregularly reflected and/or absorbed mainly by the synthetic resin particles 6 partially protruding from the film surface 7 and the silica particles 5 located on the surfaces of the synthetic resin particles 6 to provide a glossiness Gs (85)$\leq$10%.

Thus, both the glossinesses Gs(60) and the Gs(85) of the matte paint film 1 related to the 60° and 85° incident rays $L_1$ and $L_2$ can be very greatly decreased, and the absolute value of a difference between the glossinesses Gs (60) and Gs (85) can be very greatly deceased, thereby largely enhancing the matting effect.

The same is true for a case where a matte paint film 1 is formed on a PVC sheet 2 and the resulting sheet 2 is subjected to, for example, a vacuum molding to produce a synthetic resin product.

In order to enhance the irregular reflection by the synthetic resin particles 6, it is preferable to use synthetic resin particles 6 having various values of particle sizes D in a range of 2 μm$\leq$D$\leq$100 μm. In this case, for the synthetic resin particles 6, if the maximum particle size is represented by Dmax, and the minimum particle size is represented by Dmin, a suitable difference Δ D (Dmax−Dmin) between the maximum and minimum particle sizes is equal to or larger than 10 μm (Δ D$\geq$10 μm).

If the weight of transparent paint film forming material which contains the synthetic resin component 3, the matting agent 4 and an additive is represented by $W_3$, the weight percent Wp $(=(W_1/W_3)\times 100)$ of the silica particles 5 is desirably set in a range of Wp$\leq$40% by weight. If Wp>40% by weight, the transparency of the matte paint film 1 is reduced, resulting in a faded color of the PVC sheet 2.

For example, if the PVC sheet 2 is subjected to a vacuum molding with the matte paint film 1 turned toward a mold surface, the local deformation of the matte paint film 1 is prevented by the lubricating action of the synthetic resin particles 6, and the dispersed state of the silica particles 5 deposited on the surfaces of the synthetic resin particles 6 is not very different from that before the molding. Therefore, a uniform matting effect can be obtained by the silica particles 5 and the synthetic resin particles 6 even after the molding.

Moreover, the friction coefficient of the matte paint film 1 is reduced by the partial protrusion of the synthetic resin particles 6 from the film surface 7, and therefore, it is possible to reduce the sound of rubbing of the paint film 1 against another member. In addition, the contact area of the film surface 7 is decreased and therefore, the matte paint film is comfortable to the touch by the decreased contact area and moisture-proofness provided by the silica particles 5.

Substances which may be used for the synthetic resin component as the paint film forming primary material, include those used in a cold-setting paint, a cold-drying paint, a hot-setting paint and the like. Examples of these substances are polyurethane resins, acrylic-modified urethane resins, urethane acrylic vinyl chloride resins, siliconized urethane resins, acrylic resins, alkyd resins, aminoalkyd resins, epoxy resins, silicone-modified epoxy resins, silicone resins, acrylic vinyl chloride resins, and the like. Particularly, the urethane-based resin as the synthetic resin component 3 has the effects of making the matte paint film 1 comfortable to the feeling, and enhancing the moldability of the matte paint film 1.

Particles which may be used as the transparent synthetic resin particles 6 include urethane particles, acrylic particles, epoxy particles, nylon particles and the like. Particularly, urethane particles as the synthetic resin particles 6 have a rubbing sound reducing effect, and the nylon particles have an effect for making the particles 6 comfortable to the touch.

The additives include a filler, a lubricant, a weathering and high-temperature stabilizer, an anti-foaming agent, an anti-settling agent. The fillers include talc, calcium carbonate, a collagen powder, carbon black, titanium oxide ($TiO_2$) powder and the like. The lubricants include fluororubbers, silicone oil and the like. Further, examples of the weathering and high-temperature stabilizers are hindered amines, benzotriazoles and the like.

In preparing a clear matte paint composition, a procedure is employed which includes a step (a) of adding twice the amount by weight of a solvent to a paint film forming material which contains a synthetic resin component 3, a matting agent 4 and an additive, and subjecting the resulting mixture to a primary kneading, a step (b) of further adding a solvent to the primarily kneaded mixture and subjecting the resulting mixture to a secondary kneading, a step (c) of filtering the secondarily kneaded mixture to collect a filtrate, a step (d) of diluting the filtrate, and a step (e) of filtering the diluted solution to provide a matte paint composition. At the primary and secondary kneading steps, mainly at the primary kneading step, the silica particles 5 are deposited onto the surfaces of the synthetic resin particles 6. In this case, the silica particles 5 may be previously borne or carried in the surfaces of the synthetic resin particles 6 by embedding or the like.

Toluene, xylene, methyl ethyl ketone, isopropanol may be used alone or in the form of a liquid mixture as the solvent.

In painting, a spray paint, a gravure printing or the like may be utilized.

Specified examples will now be described.

An acrylic-modified urethane resin was selected as the synthetic resin component 3. Silica particles having an average particle size $D_1$ of 0.2 μm (made under a trade name of Sysilia 350 by Fuji Silysia Chemical Ltd.) and silica particles having an average particle size $D_1$ of 0.04 μm (made under a trade name of Aerosil TT-600 by Aerosil Co.) were selected as the silica particles 5 in the matting agent 4. Transparent urethane particles having an average particle size $D_2$ of 15 μm (made under a trade name of Artpearl C-400 by Negami Industries Co.) was selected as the synthetic resin particles 6. The maximum particle size Dmax of the urethane particles 6 was equal to 30 μm, and the minimum particle size D-min of the urethane particles 6 was equal to 5 μm. Therefore, a difference ΔD (=Mmax−Dmin) between the maximum and minimum particle sizes was equal to 25 μ, where the particle sizes D varied in a range of 5 μm$\leq$D$\leq$30 μm.

A weathering and high-temperature stabilizer (benzotriazole) was selected as the additive, and a mixture of the following four substances was selected as the solvent.

(A) An acrylic-modified urethane resin, a matting agent containing silica particles having an average particle size $D_1$ of 0.2 μm, a weathering and high-temperature stabilizer and a solvent were used and mixed together at the following percents by weight based on the total weight of the composition:

| | |
|---|---|
| Acrylic-modified urethane resin | 4.46% by weight |
| Matting agent | 1.34% by weight |
| Weathering and high-temperature stabilizer | 0.09% by weight |
| Solvent | 94.11% by weight |

In the matting agent 4, the weight ratio Wr of the silica particles 5 to the urethane particles 6 was varied. For comparison, a mixture using only silica particles 5 having an average particle size $D_1$ of 0.2 μm as the matting agent, and a mixture using only urethane particles 6, were prepared.

Then, using those mixtures, matte paint compositions were prepared in the same manner as described above. Thereafter, using each of the matte paint compositions, a transparent matte paint film 1 was formed on a surface of a PVC sheet 2 by spray painting. The thickness t of the paint film was of 10 μm in each of examples 1 to 4 and in comparative examples 1a and 2a. The weight proportion Pw of silica particles 5 and/or urethane particles 6 incorporated per 100 parts by weight of the acrylic-modified urethane resin was 30 parts by weight in each of examples 1 to 4 and in comparative examples 1a and 2a. The weight ratio Wr of the silica particles 5 to the urethane particles 6 and the weight percent Wp of the silica particles 5 based on the paint film forming material were as shown in Table 1.

TABLE 1

| Matte paint film | Weight ratio of silica particles to urethane particles Wr | Weight percent of silica particles Wp (% by weight) |
| --- | --- | --- |
| Example 1 | 20/80 | 4.6 |
| Example 2 | 30/70 | 6.8 |
| Example 3 | 50/50 | 11.4 |
| Example 4 | 70/30 | 15.9 |
| Comparative Example 1a | 0/100 | 0 |
| Comparative Example 2a | 100/0 | 22.8 |

Figure 2:
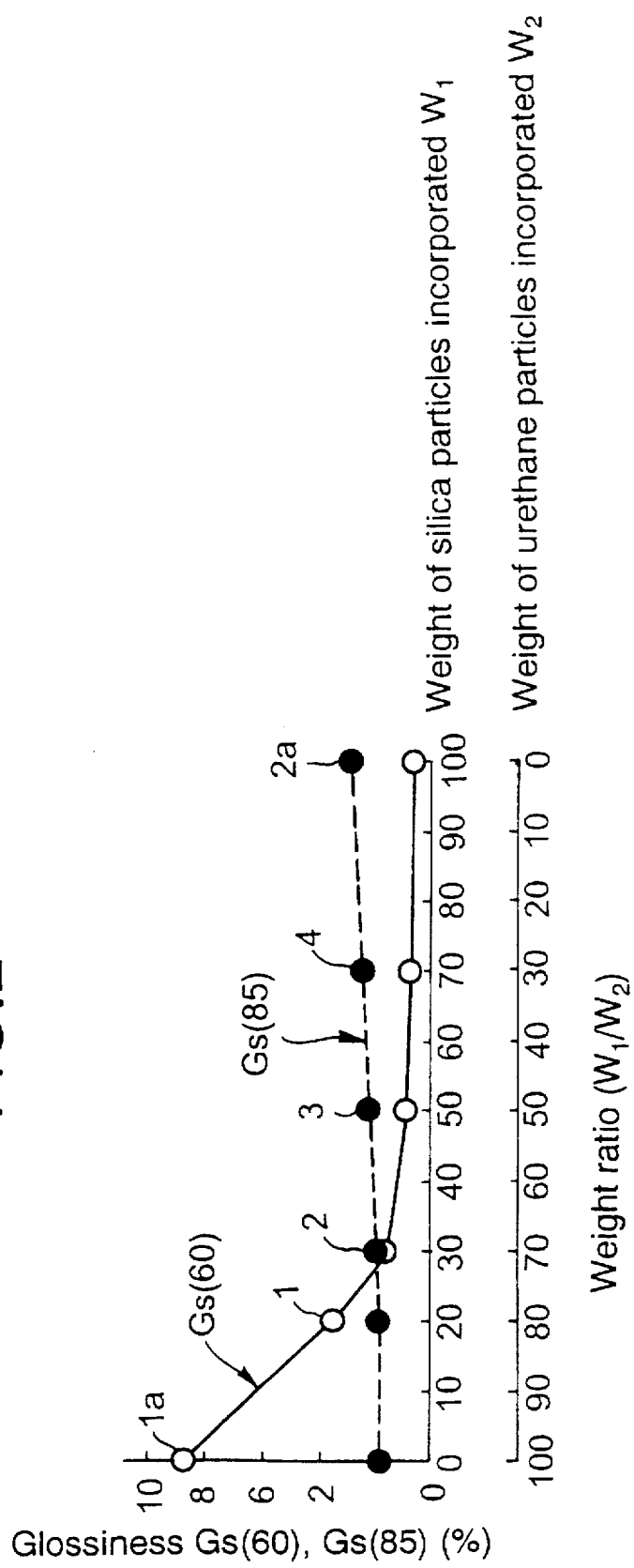
FIG. 2 is a graph illustrating a first example of the relationship between the weigh ratio Wr of silica particles to urethane particles and the glossiness Gs(60) and Gs(85)

Glossinesses Gs(60) and Gs(85) provided by the 60° and 85° incident rays were measured for examples 1 to 4 and comparative examples 1a and 2a, and the relationship of the weight ratio Wr of the silica particles 5 to the urethane particles 6 and the glossinesses Gs(60) and Gs(85) was examined, thereby providing results shown in FIG. 2. In FIG. 2, points 1 to 4, 1a and 2a correspond to examples 1 to 4 and comparative examples 1a and 2a, respectively.

As apparent from FIG. 2, if the weight ratio Wr was set in a range of $20/80 \leq Wr \leq 70/30$ when the average particle size $D_1$ of the silica particles 5 was in a range of $D_2 \leq 2$ μm, the average particle size $D_2$ of the urethane particles 6 was in a range of 8 $\mu m \leq D_2 \leq 50$ μm, the weight proportion Pw of matting agent 4 incorporated was in a range of 20 parts by weight $\leq Pw \leq 100$ parts by weight, and the thickness t of the paint film was in a range of 8 $\mu m \leq t \leq 30$ μm, both of the glossinesses Gs(60) and Gs(85) can be very greatly decreased, and the absolute value of a difference between the glossinesses Gs(60) and Gs(85) can be very greatly decreased, thereby largely enhancing the matting effect. An optimum weight ratio Wr is 30/70, at which the absolute value of the difference between the glossinesses Gs(60) and Gs(85) is the smallest.

If the weight $W_1$ of silica particles 5 incorporated is 0 (zero) as in the comparative example 1a, the glossiness Gs(60) is greatly increased. On the other hand, if the weight $W_2$ of urethane particles 6 incorporated is 0 (zero) as in the comparative example 2a, the glossiness Gs(85) is greatly increased.

(B) An acrylic-modified urethane resin, a matting agent containing silica particles having an average particle size $D_1$ of 0.04 μm, a weathering and high-temperature stabilizer and a solvent were used and mixed at the following percents, based on the total weight of the composition:

| | |
| --- | --- |
| Acrylic-modified urethane resin | 4.15% by weight |
| Matting agent | 1.66% by weight |
| Weathering and high-temperature stabilizer | 0.08% by weight |
| Solvent | 94.11% by weight |

In the matting agent 4, the weight ratio Wr of the silica particles 5 to the urethane particles 6 was varied. For comparison, a mixture using only silica particles 5 having an average particle size $D_1$ of 0.04 μm as the matting agent and a mixture using only urethane particles 6 were prepared.

Then, using those mixtures, matte paint compositions were prepared in the same manner as described above. Thereafter, using each of the matte paint compositions, a transparent matte paint film 1 was formed on the surface of a PVC sheet 2 by a spray paint. The thickness t of the paint film was of 10 μm in each of examples 5 to 8 and in comparative examples 3a and 4a. The weight proportion Pw of silica particles 5 and/or urethane particles 6 incorporated per 100 parts by weight of the acrylic-modified urethane resin was 40 parts by weight in each of examples 5 to 8 and in comparative examples 3a and 4a. The weight ratio Wr of the silica particles 5 to the urethane particles 6 and the weight percent Wp of the silica particles 5 based on the paint film forming material were as shown in Table 2.

TABLE 2

| Matte paint film | Weight ratio of silica particles to urethane particles Wr | Weight percent of silica particles Wp (% by weight) |
| --- | --- | --- |
| Example 5 | 20/80 | 5.6 |
| Example 6 | 30/70 | 8.5 |
| Example 7 | 50/50 | 14.1 |
| Example 8 | 70/30 | 19.7 |
| Comparative Example 3a | 0/100 | 0 |
| Comparative Example 4a | 100/0 | 28.2 |

Figure 3:
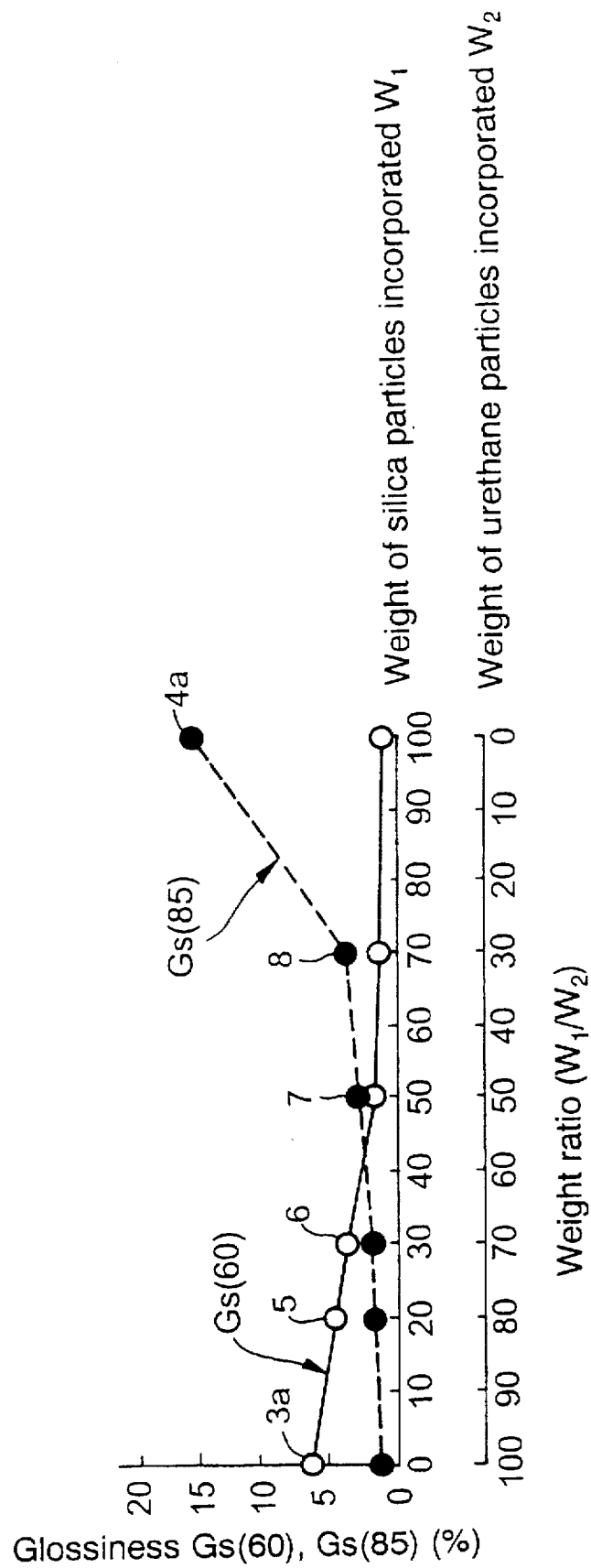
FIG. 3 is a graph illustrating a second example of the relationship between the weight ratio Wr of silica particles to urethane particles and the glossiness Gs(60) and Gs(85)

Glossinesses Gs(60) and Gs(85) provided by the 60° and 85° incident rays were measured for examples 5 to 8 and comparative examples 3a and 4a, and the relationship of the weight ratio Wr of the silica particles 5 to the urethane particles 6 and the glossinesses Gs(60) and Gs(85) was examined, thereby providing results shown in FIG. 3. In FIG. 3, points 5 to 8, 3a and 4a correspond to the examples 5 to 8 and the comparative examples 3a and 4a, respectively.

As apparent from FIG. 3, if the weight ratio Wr was set in a range of $20/80 \leq Wr \leq 70/30$ when the average particle size $D_1$ of the silica particles 5 was in a range of $D_2 \leq 2$ μm, the average particle size $D_2$ of the urethane particles 6 was in a range of 8 $\mu m \leq D_2 \leq 50$ μm, the weight proportion Pw of matting agent 4 incorporated was in a range of 20 parts by weight $\leq Pw \leq 100$ parts by weight, and the thickness t of the paint film was in the range of 8 $\mu m \leq t \leq 30$ μm, both of the glossinesses Gs(60) and Gs(85) can be very greatly decreased, and the absolute value of the difference between the glossinesses Gs(60) and Gs(85) can be very greatly decreased, thereby largely enhancing the matting effect. An optimum weight ratio Wr is 43/57, at which the absolute value of the difference between the glossinesses Gs(60) and Gs(85) is the smallest.

If the weight $W_1$ of silica particles 5 incorporated is of 0 (zero) as in comparative example 3a, the glossiness Gs(60) is increased. On the other hand, if the weight $W_2$ of urethane particles 6 incorporated is of 0 (zero) as in comparative example 4a, the glossiness Gs(85) is greatly increased.

Figure 4:
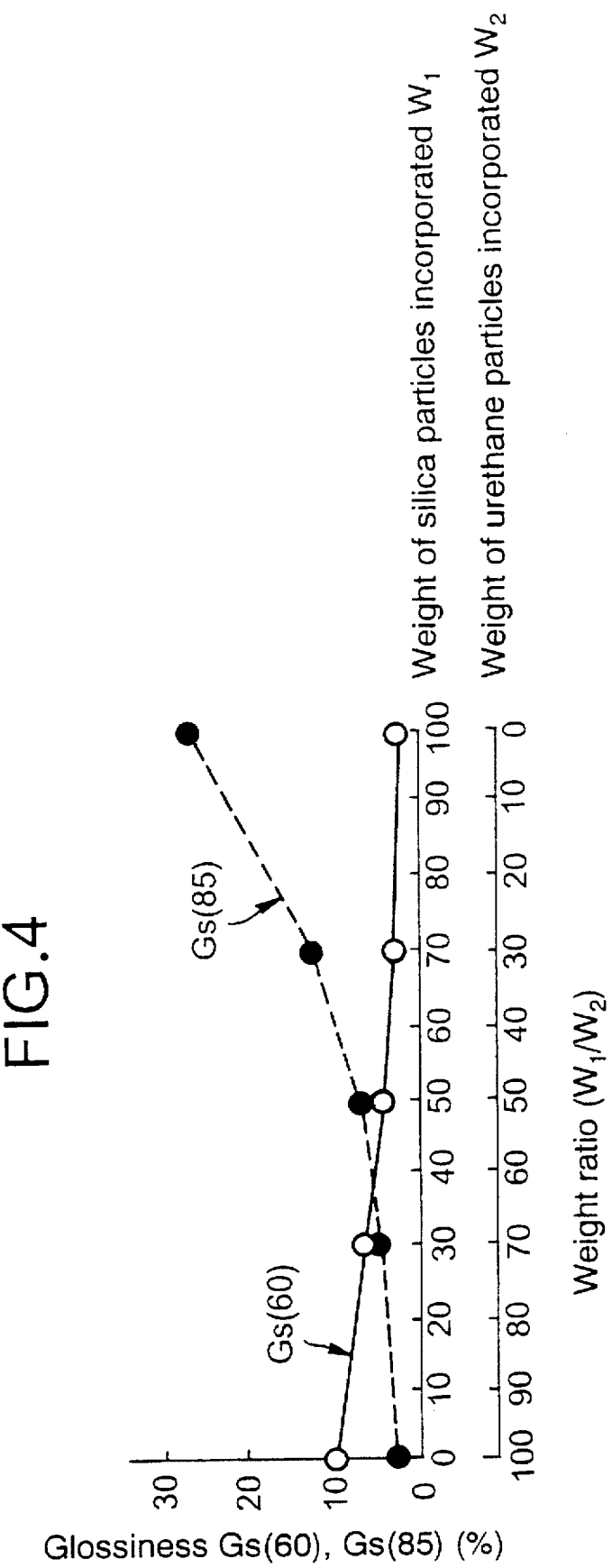
FIG. 4 is a graph illustrating a third example of the relationship between the weight ratio Wr of silica particles to urethane particles and the glossiness Gs(60) and Gs(85)
Figure 5:
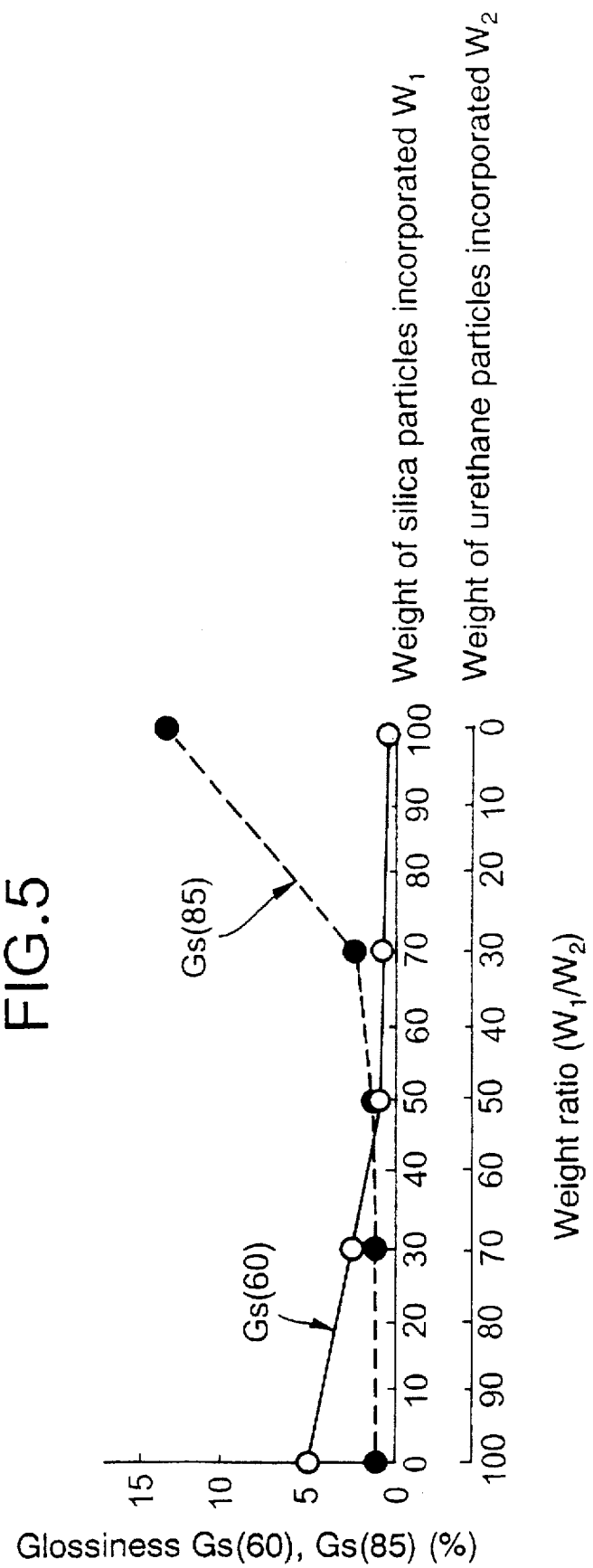
FIG. 5 is a graph illustrating a fourth example of the relationship between the weight ratio Wr of silica particles to urethane particles and the glossiness Gs(60) and Gs(85)
Figure 6:
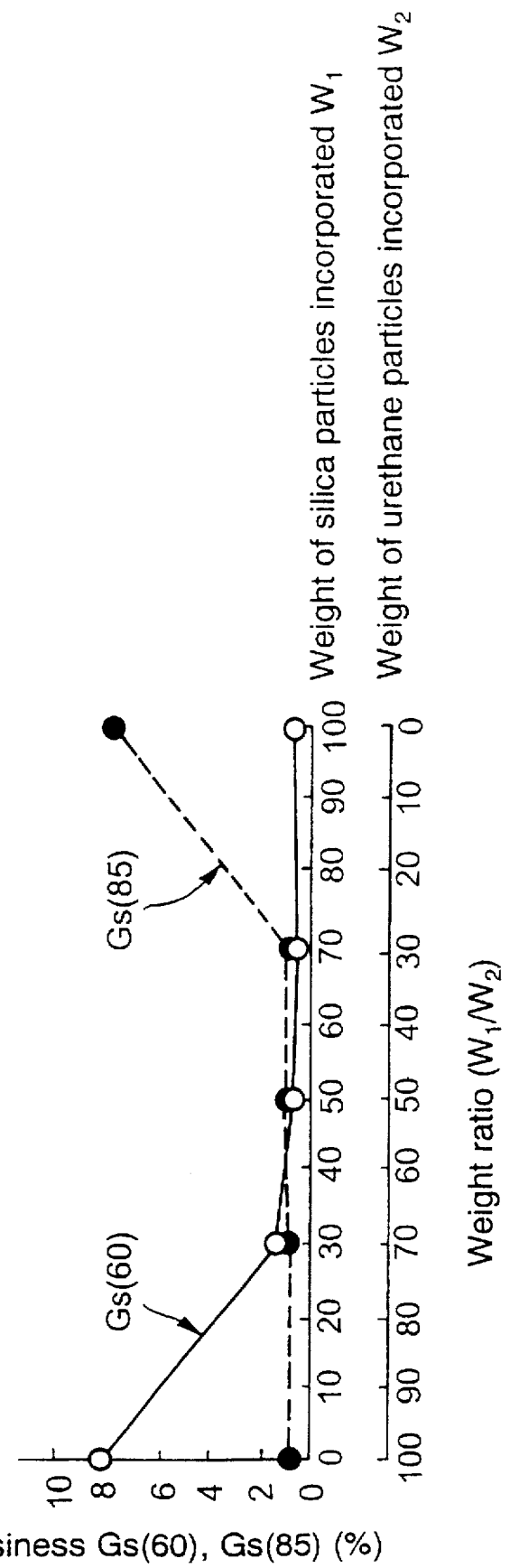
FIG. 6 is a graph illustrating a fifth example of the relationship between the weight ratio Wr of silica particles to urethane particles and the glossiness Gs(60) and Gs(85)

Then, the weight proportion Pw of silica particles 5 and/or urethane particles 6 incorporated per 100 parts by weight of the acrylic-modified urethane resin in the matte paint composition having the above-described proportion of components incorporated was varied to form various matte paint films 1. For these matte paint films 1, glossinesses Gs(60) and Gs(85) provided by the 60° and 85° incident rays were measured, and the relationship between the weight ratio Wr of the silica particles 5 to the urethane particles 6 and the glossinesses Gs(60) and Gs(85) was examined, thereby providing results shown in FIGS. 4, 5 and 6. FIGS. 4, 5 and 6 correspond to the results provided when the weight proportion Pw of matting agent 4 incorporated was set at 30, 50, 60 parts by weight, respectively.

It can be seen from FIGS. 4, 5 and 6 that to enhance the matting effect, the weight ratio Wr may be set in the range of $20/80 \leq Wr \leq 70/30$.

Figure 7:
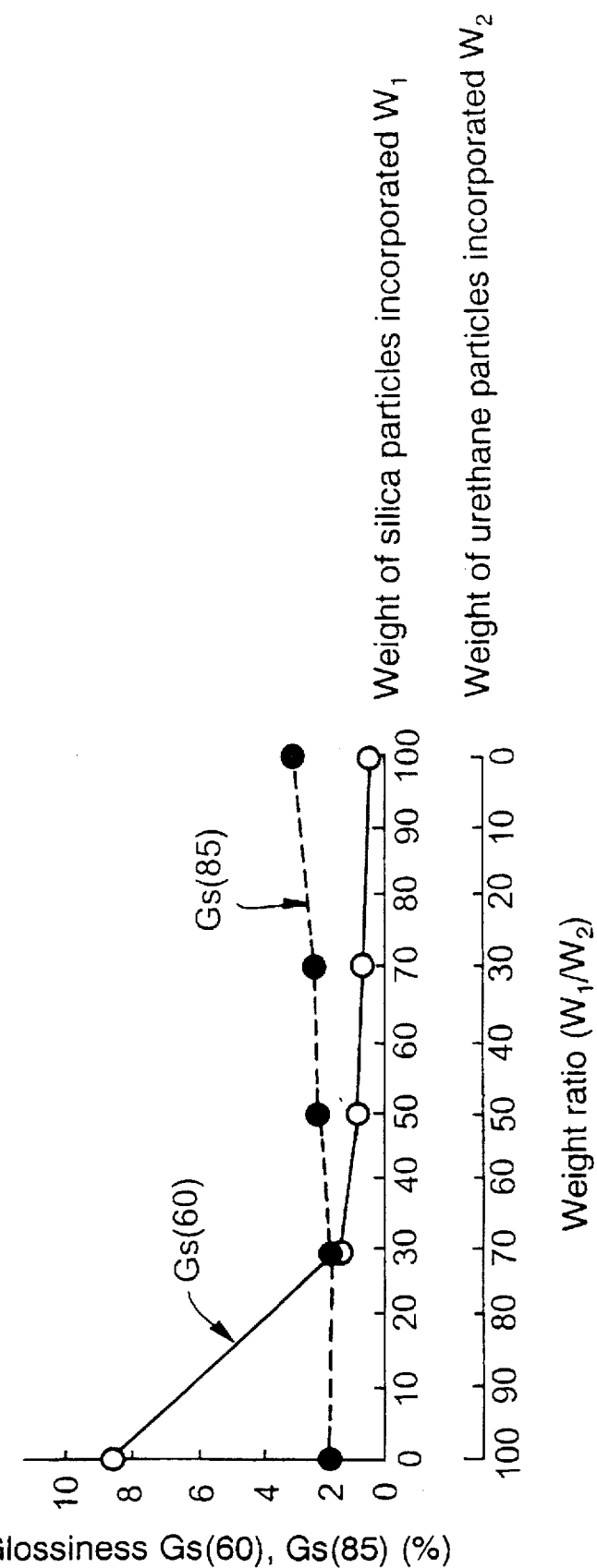
FIG. 7 is a graph illustrating a sixth example of the relationship between the weight ratio Wr of silica particles to urethane particles and the glossiness Gs(60) and Gs(85)
Figure 8:
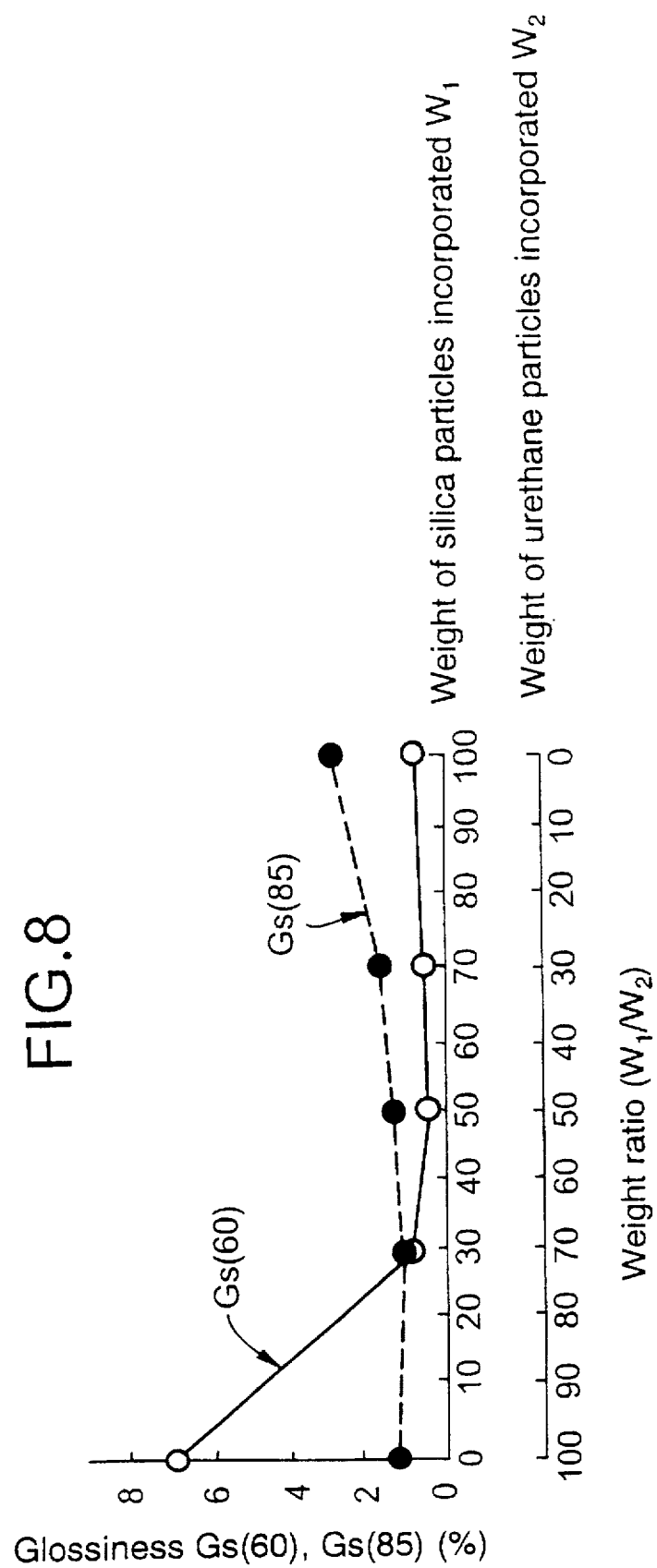
FIG. 8 is a graph illustrating a seventh example of the relationship between the weight ration Wr of silica particles to urethane particles and the glossiness Gs(60) and Gs(85)

A matting agent containing silica particles having an average particle size $D_1$ of 0.2 μm was used in place of the silica particles having an average particle size of 0.04 μm in the matte paint composition having the above-described proportions of components incorporated therein, and the weight proportion Pw of silica particles 5 and/or urethane particles 6 incorporated per 100 parts by weight of the acrylic-modified urethane resin in the matte paint composition having the above-described proportions of components incorporated therein was varied to form various matte paint films 1. For these matte paint films 1, glossinesses Gs(60) and Gs(85) provided by the 60° and 85° incident rays were measured, and the relationship between the weight ratio Wr of the silica particles 5 to the urethane particles 6 and the glossinesses Gs(60) and Gs(85) was examined, thereby providing the results shown in FIGS. 7 and 8. FIGS. 7 and 8 correspond to the results provided when the weight proportion Pw of matting agent 4 was set at 30 and 40 parts by weight, respectively.

It can be seen from FIGS. 7 and 8 that to enhance the matting effect, the weight ratio Wr may be set in the range of 20/80≦Wr≦70/30.

Figure 9:
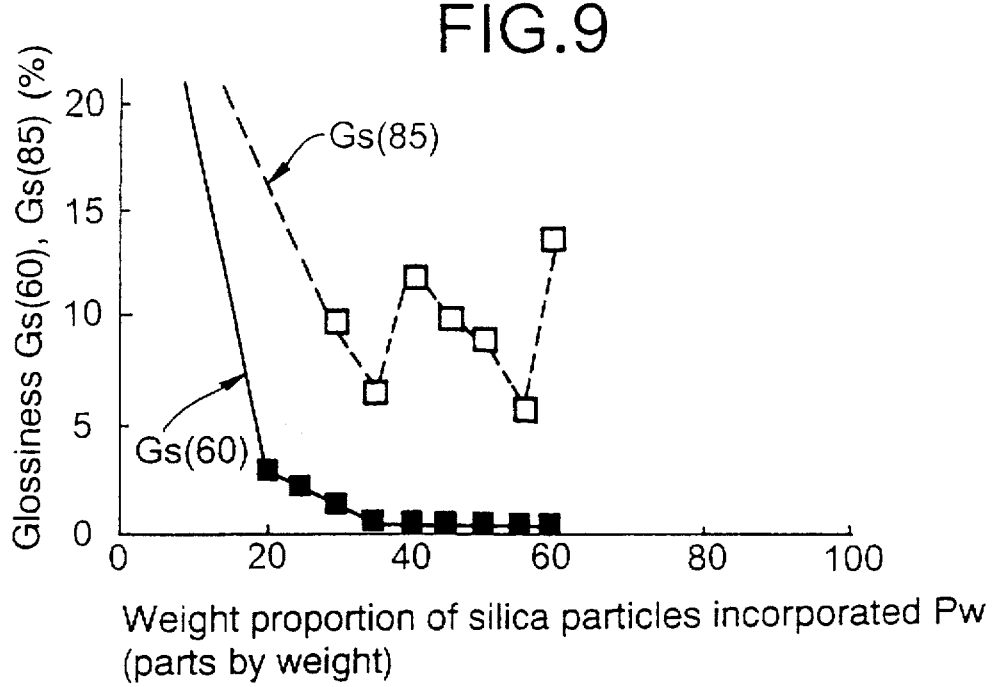
FIG. 9 is a graph illustrating the relationship between the weight proportion Pw of silica particles incorporated per 100 parts by weight of an acrylic-modified urethane resin and the glossiness Gs(60) and Gs(85)

(C) FIG. 9 shows the relationship between the weight proportion of silica particles incorporated per 100 parts by weight of the acrylic-modified urethane resin and the glossinesses Gs(60) and Gs(85) for a matte paint film of a comparative example made using only silica particles as the matting agent. Silica particles having an average particle size $D_1$ of 0.2 μm were used.

It can be seen from FIG. 9 that if only silica particles are used, the glossiness Gs(85) is largely varied in a higher range, and the absolute value of a difference between both the glossinesses Gs(60) and Gs(85) is large.

Figure 10:
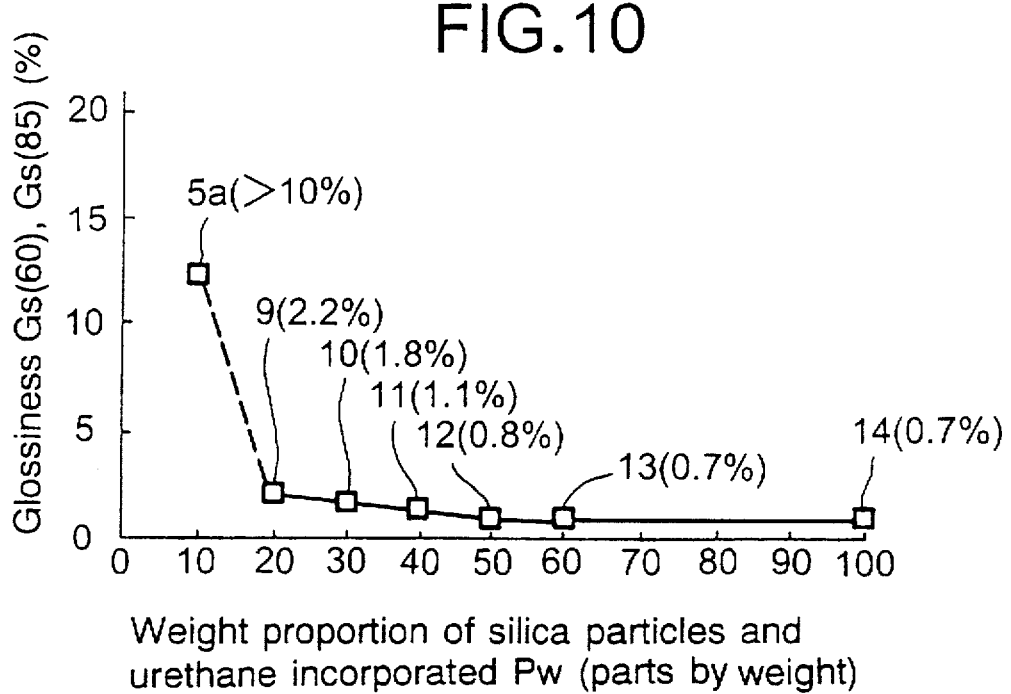
FIG. 10 is a graph illustrating one example of the relationship between the weigh proportion Pw of silica particles and urethane particles incorporated per 100 parts by weight of an acrylic-modified urethane resin and the glossiness Gs(60) and Gs(85)

(D) FIG. 10 shows the relationship between the weight proportion Pw of silica particles 5 and urethane particles per 100 parts by weight of the acrylic-modified urethane resin and the glossinesses Gs(60) and Gs(85) for a matte paint film 1. In FIG. 10, points 9 to 14 and 5a correspond to examples 9 to 14 and comparative example 5a, respectively.

In examples 9 to 14 and in comparative example 5a, silica particles 5 having an average particle size $D_1$ of 0.2 μm were used. The weight ratio Wr of the silica particles 5 to the urethane particles 6 was set at 30/70, and the thickness t of the paint film was set at 10 μm. As apparent from FIG. 2, Wr=30/70 results in Gs(60)=Gs(85). The percentages enclosed in parentheses in FIG. 10 indicate values of Gs(60) and Gs(85).

The weight percents Wp of the silica particles 5 based on the paint film forming material in examples 9 to 14 and comparative example 5a are as shown in Table 3:

TABLE 3

| Matte paint film | Weight percent Wp of silica particles |
|---|---|
| Example 9 | 4.92 |
| Example 10 | 6.82 |
| Example 11 | 8.45 |
| Example 12 | 9.87 |
| Example 13 | 11.11 |
| Example 14 | 14.85 |
| Comparative Example 5a | 2.68 |

As apparent from FIG. 10, if the weight proportion Pw is set in the range of 20 parts by weight≦Pw≦100 parts by weight, both of the glossinesses Gs(60) and Gs(85) can be substantially decreased.

Figure 11:
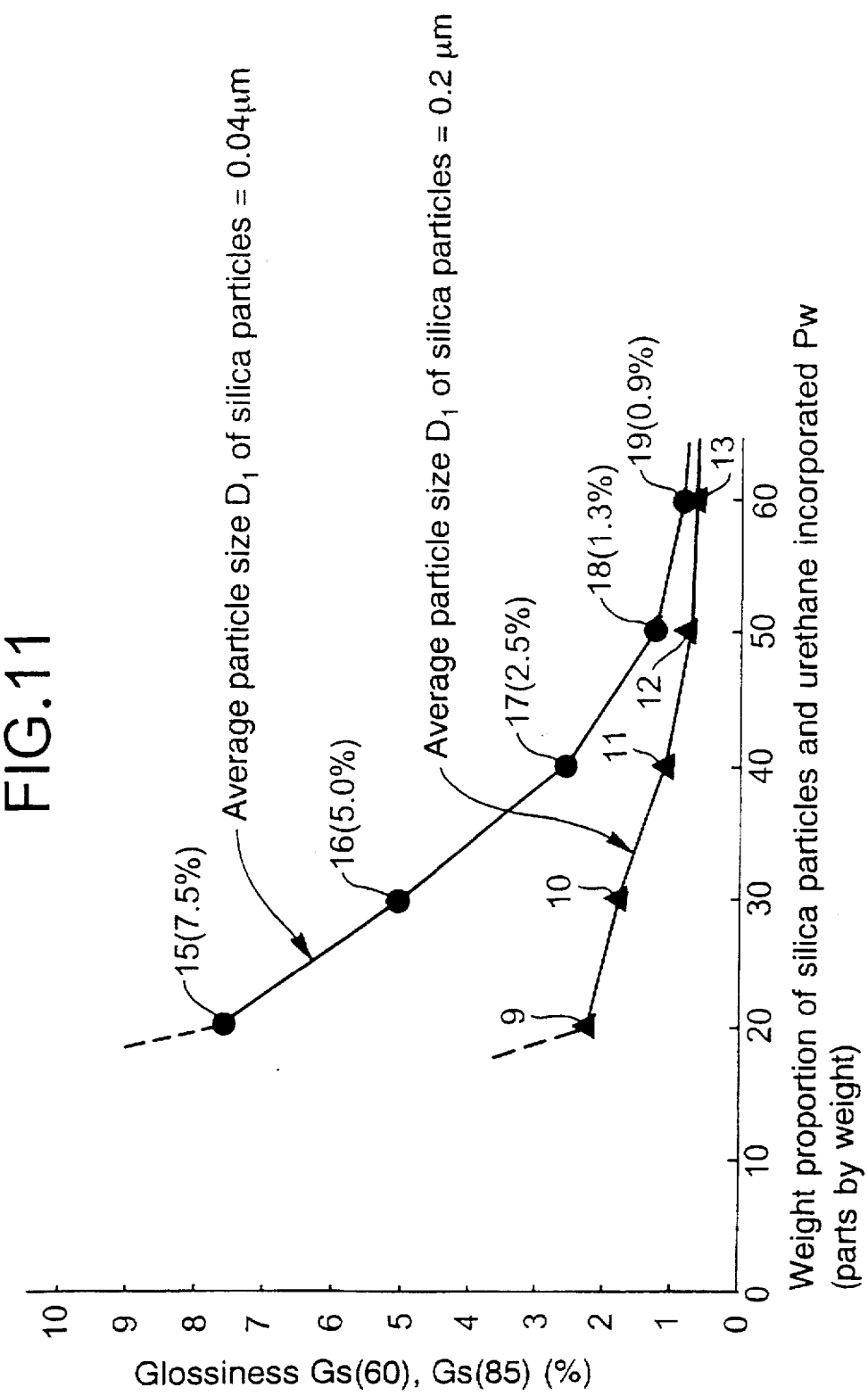
FIG. 11 is a graph illustrating another example of the relationship between the weight proportion Pw of silica particles and urethane particles incorporated per 100 parts by weight of an acrylic-modified urethane resin and the glossiness Gs(60) and Gs(85)

(E) FIG. 11 shows the relationship between the weight proportion Pw of silica particles 5 and urethane particles 6 per 100 parts by weight of the acrylic-modified urethane resin and the glossinesses Gs(60) and Gs(85) for the matte paint film 1. In FIG. 11, points 15 to 19 correspond to examples 15 to 19, respectively. For comparison, glossinesses Gs(60) and Gs(85) for examples 9 to 13 are also shown in FIG. 11.

In examples 15 to 19, silica particles 5 having an average particle size $D_1$ of 0.04 μm were used. The weight ratio Wr of the silica particles 5 to the urethane particles 6 was set at 40/60, and the thickness t of the paint film was set at 10 μm. As can be seen from FIG. 3, Wr=40/60 results in Gs(60)=Gs(85). The percentages enclosed in parentheses in FIG. 10 indicate values of Gs(60) and Gs(85).

In examples 15 to 19, the weight percents Wp of the silica particles 5 based on the paint film forming material are as shown in Table 4:

TABLE 4

| Matte paint film | Weight percents Wp (% by weight) of silica particles |
|---|---|
| Example 15 | 6.56 |
| Example 16 | 9.09 |
| Example 17 | 11.27 |
| Example 18 | 13.16 |
| Example 19 | 14.81 |

As apparent from FIG. 11, it can be seen that as the average particle size $D_1$ of the silica particles increases, the glossinesses Gs(60) and Gs(85) decrease.

Figure 12:
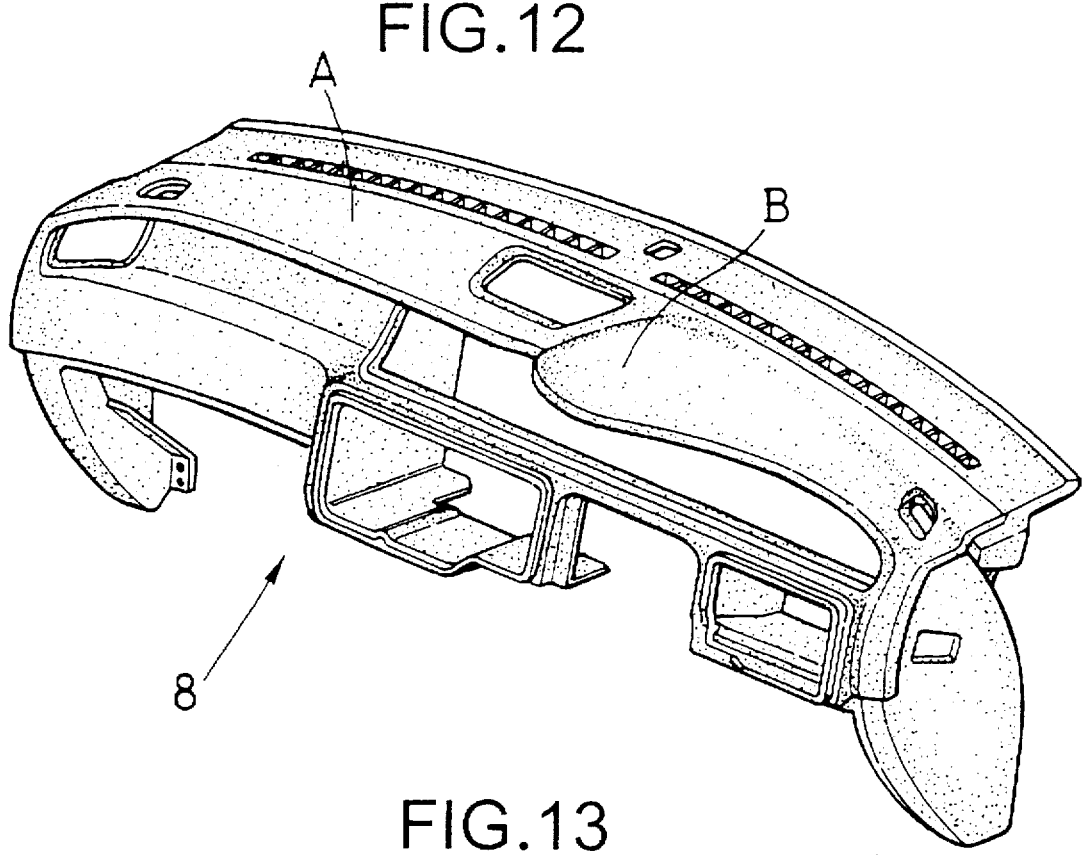
FIG. 12 is a perspective view of an instrument panel for a vehicle.

(F) FIG. 12 shows an instrument panel 8 for a vehicle. The instrument panel 8 is comprised of a core, and a PVC sheet 2 which has a matte paint film bonded to the core and serving as a skin. In producing the instrument panel 8, a procedure is employed which includes a step of subjecting the PVC sheet 2 to a vacuum molding with the matte paint film 1 turned toward mold surface, and a step of bonding the resulting PVC sheet 2 to the previously molded core. In this case, a relatively flat portion is a portion A stretched to a smaller extent, and a convex arcuate portion is a portion B stretched to a larger extent.

Table 5 shows the compositions of example 20 and comparative example 6a of the matte paint films 1 in the instrument panel 8.

TABLE 5

| | Matte paint film | |
|---|---|---|
| | Example 20 | Comparative Example 6a |
| Acrylic-modified urethane resin | 63.6% by weight | 63.5% by weight |
| Silica particles ($D_1$ = 0.2 μm) | 10.5% by weight (weight percent Wp) | 34.6% by weight |
| urethane particle | 24.5% by weight | — |
| Weathering and high-temperature stabilizer | 1.4% by weight | 1.9% by weight |
| Weight proportion Pw | 56% by weight | 54% by weight |
| Weight ratio Wr | 30/70 | — |
| Thickness t of paint film | 10 μm | 10 μm |

Tables 6 and 7 show the glossinesses Gs(60) and Gs(85) at the portion A stretched to the smaller extent and the portion B stretched to the larger extent for example 20 and comparative example 6a. Table 6 corresponds to the case where the PVC sheet 2 is black in color, and Table 7 corresponds to the case where the PVC sheet 2 is gray in color.

TABLE 6

| Black PVC sheet | | Matte paint film | |
|---|---|---|---|
| | | Example 20 | Comparative Example 6a |
| Portion A stretched to smaller extent | Gs (60) | 1.05% | 1.4% |
| | Gs (85) | 0.85% | 2.8% |
| Portion B stretched to larger extent | Gs (60) | 1% | 0.75% |
| | Gs (85) | 0.75% | 2.3% |

TABLE 7

| Gray PVC sheet | | Matte paint film | |
|---|---|---|---|
| | | Example 20 | Comparative example 6a |
| Portion A stretched to smaller extent | Gs (60) | 1.2% | 1.7% |
| | Gs (85) | 1.25% | 2.85% |
| Portion B stretched to larger extent | Gs (60) | 0.95% | 0.95% |
| | Gs (85) | 0.95% | 2.1% |

As apparent from tables 6 and 7, it can be seen that the glossinesses Gs(60) and Gs(85) at both of the portion A stretched to the smaller extent and the portion B stretched to the larger extent are lower in example 20, and the absolute value of a difference between the glossinesses Gs(60) and Gs(85) is small, as compared with comparative example 6a.

Figure 13:
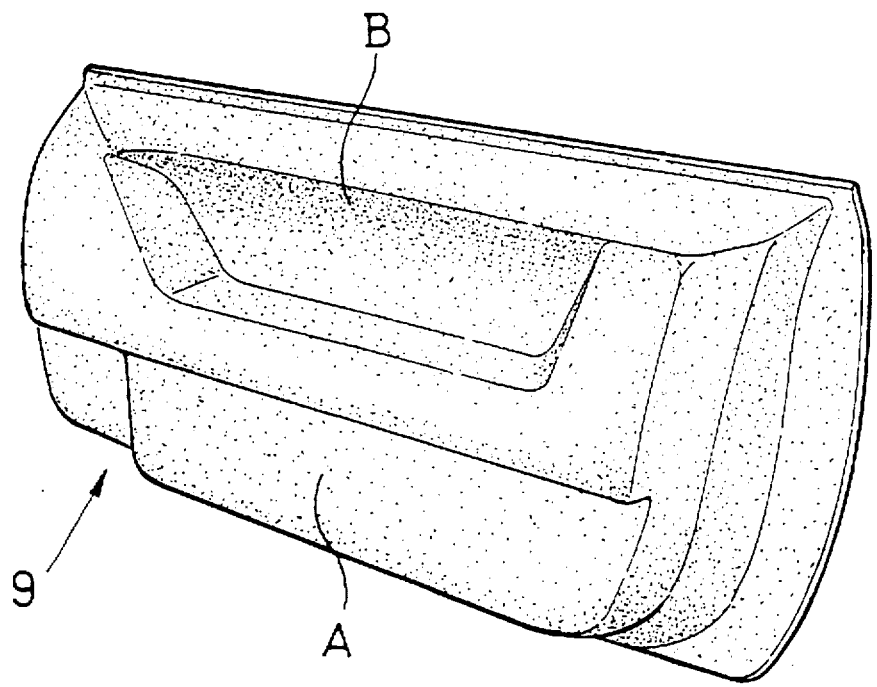
FIG. 13 is a perspective view of a door lining for a vehicle.

(G) FIG. 13 shows a door lining 9 for a vehicle. The door lining 9 is comprised of a core and a PVC sheet 2 which has a matte paint film 1 bonded to the core and serving as a skin. The door lining 9 is produced in the substantially same manner as is the instrument panel 8. In this case, a relatively flat portion is a portion A stretched to a smaller extent, and a concave arcuate portion is a portion B stretched to a larger extent.

Table 8 shows the glossinesses Gs(60) and Gs(85) at the portion A stretched to a smaller extent and the portion B stretched to the larger extent for example 21 and comparative example 7a of matte paint films 1 in the door lining 9. In this case, the PVC sheet 2 is black in color.

The composition in example 21 is the same as that in example 20, and the composition in comparative example 7a is the same as that in comparative example 6a.

TABLE 8

| Black PVC sheet | | Matte paint film | |
|---|---|---|---|
| | | Example 21 | Comparative example 7a |
| Portion A stretched to smaller extent | Gs (60) | 1.9% | 2.4% |
| | Gs (85) | 1.4% | 4% |
| Portion B stretched to larger extent | Gs (60) | 1.3% | 1.4% |
| | Gs (85) | 1.4% | 3.8% |

As apparent from table 8, it can be seen that the glossinesses Gs(60) and Gs(85) at both of the portion A stretched to the smaller extent and the portion B stretched to the larger extent are low in the example 21, as compared with the comparative example 7a, and the absolute value of a difference between the glossinesses Gs(60) and Gs(85) is small, as compared with the comparative example 7a.

What is claimed is:

1. A matte paint film, for use on an interior article of a vehicle, having a thickness of 8 to 30 μ comprising:

a film-forming synthetic resin component, and a matting agent consisting of silica particles having an average particle size equal to or less than 2 μm, and synthetic resin particles having an average particle size of 8 to 50 μm;

said film containing 20 to parts by weight of the matting agent per 100 parts by weight of the film-forming synthetic resin component, wherein the ratio by weight of the silica particles to the synthetic resin particles in the matting agent is 20/80 to 70/30, and wherein at least some of the silica particles are deposit on surfaces of at least some of the synthetic resin particles.

2. A matte paint film according to claim 1, wherein the difference between the maximum particle size and the minimum particle size of the synthetic resin particles is equal to or larger than 10 μm.

3. A matte paint film according to claim 1, wherein the weight of the silica particles is equal to or smaller than 40% of the weight of the paint film.

4. A matte paint composition, for a film formed on an interior article of a vehicle, comprising:

a film-forming synthetic resin component, and a matting agent silica particles having an average particle size equal to or less than 2 μm, and synthetic resin particles having an average particle size of 8 to 50 μm;

said composition containing 20 to 80 parts by weight of the matting agent per 100 parts by weight of the synthetic resin component, wherein the ratio by weight of the weight of the silica particles in the matting agent to the weight of synthetic resin particles in the matting agent is 20/80 to 70/30, and wherein at least some of the silica particles are deposited on surfaces of at least some of the synthetic resin particles.

5. A matte paint composition according to claim 4, wherein the difference between the maximum particle size and the minimum particle size of the synthetic resin particles is equal to or larger than 10 μm.

6. A matte paint composition according to claim 4, wherein the weight of the silica particles is equal to or smaller than 40% by weight of the composition.

* * * * *

UNITED STATES PATENT AND TRADEMARK OFFICE
CERTIFICATE OF CORRECTION

PATENT NO. : 5,760,122
DATED : June 2, 122

INVENTOR(S) : Daisuke Susa, et. al.

It is certified that error appears in the above-identified patent and that said Letters Patent is hereby corrected as shown below:

Title page, item [73], Assignee: add –TOKUSHU SHIKIRYO COLOR & CHEMICALS, both of --.

Signed and Sealed this

Sixteenth Day of February, 1999

Attest:

*Acting Commissioner of Patents and Trademarks*

*Attesting Officer*